(12) United States Patent
Glueck et al.

(10) Patent No.: US 10,444,095 B2
(45) Date of Patent: Oct. 15, 2019

(54) RAIL MEASURING SYSTEM

(71) Applicant: Thales Deutschland GmbH, Ditzingen (DE)

(72) Inventors: Martin Glueck, Stuttgart (DE); Mathias Mueller, Munich (DE)

(73) Assignee: THALES DEUTSCHLAND GMBH, Ditzingen (DE)

( * ) Notice: Subject to any disclaimer, the term of this patent is extended or adjusted under 35 U.S.C. 154(b) by 223 days.

(21) Appl. No.: 15/212,461

(22) Filed: Jul. 18, 2016

(65) Prior Publication Data

US 2016/0356661 A1    Dec. 8, 2016

Related U.S. Application Data

(63) Continuation of application No. PCT/EP2015/050797, filed on Jan. 16, 2015.

(30) Foreign Application Priority Data

Jan. 21, 2014    (DE) .......................... 10 2014 100 653

(51) Int. Cl.
*G01L 1/24* (2006.01)
*B61L 23/04* (2006.01)
(Continued)

(52) U.S. Cl.
CPC ................ *G01L 1/246* (2013.01); *B61K 9/08* (2013.01); *B61L 23/04* (2013.01); *B61L 23/042* (2013.01);
(Continued)

(58) Field of Classification Search
CPC .......... B61L 1/166; B61L 1/163; B61L 1/167; B61L 1/168; B61L 1/169; B61L 1/161;
(Continued)

(56) References Cited

U.S. PATENT DOCUMENTS

| | | | | |
|---|---|---|---|---|
| 5,319,435 A | * | 6/1994 | Melle | ...................... G01B 11/16 250/227.18 |
| 5,330,136 A | * | 7/1994 | Colbaugh | ................. B61L 1/06 246/122 R |

(Continued)

FOREIGN PATENT DOCUMENTS

| | | |
|---|---|---|
| CN | 101 797 928 A | 8/2010 |
| DE | 695 21 971 T2 | 4/2002 |

(Continued)

*Primary Examiner* — Harshad R Patel
*Assistant Examiner* — Tran M. Tran
(74) *Attorney, Agent, or Firm* — Hackler Daghighian Martino & Novak

(57) ABSTRACT

At least one fiber-optic sensor unit measures a mechanical variable which affects a rail having a certain length and a neutral axis that extends along said length of the rail. The at least one fiber-optic sensor unit is disposed at an angle of 30° to 60°, in particular 45°, relative to the neutral axis or at an angle of −30° to −60°, in particular −45°, relative to the neutral axis. The at least one fiber-optic sensor unit is irradiated with primary light in order to generate a signaling light in a reflection mode or transmission mode. The intensity of the signaling light is sensed. The signaling light is evaluated.

18 Claims, 5 Drawing Sheets

(51) Int. Cl.
    *B61L 25/02* (2006.01)
    *G01M 11/08* (2006.01)
    *B61K 9/08* (2006.01)
(52) U.S. Cl.
    CPC .......... *B61L 23/047* (2013.01); *B61L 25/021*
    (2013.01); *G01L 1/247* (2013.01); *G01M*
    *11/085* (2013.01)
(58) Field of Classification Search
    CPC .............. G01D 5/35374; G01D 5/353; G02B
    6/02176; G02B 6/0026; G01B 11/16;
    G01B 11/18; G01B 11/24; G01B 11/245;
    G01B 11/246; G01B 11/2441; G01L 1/24;
    G01L 1/242
    See application file for complete search history.

(56) References Cited

U.S. PATENT DOCUMENTS

| | | | | |
|---|---|---|---|---|
| 5,361,130 | A * | 11/1994 | Kersey | G01D 5/35303 250/227.27 |
| 5,462,244 | A * | 10/1995 | Van Der Hoek | B61L 1/06 246/122 R |
| 5,529,267 | A * | 6/1996 | Giras | B61L 1/06 246/120 |
| 5,713,540 | A * | 2/1998 | Gerszberg | B61L 1/06 246/121 |
| 5,726,744 | A | 3/1998 | Ferdinand et al. | |
| 5,743,495 | A * | 4/1998 | Welles, II | B61L 23/044 246/121 |
| 6,586,722 | B1 * | 7/2003 | Kenny | G01L 1/246 250/227.16 |
| 7,119,960 | B1 * | 10/2006 | Erdogan | G02B 5/288 359/589 |
| 7,379,169 | B1 * | 5/2008 | Kraemer | G01D 5/35303 356/73.1 |
| 7,392,117 | B1 * | 6/2008 | Bilodeau | B61L 23/042 246/120 |
| 7,466,879 | B2 * | 12/2008 | Tjin | G01D 5/35303 385/12 |
| 7,512,294 | B2 * | 3/2009 | Wang | A61B 5/6892 385/13 |
| 7,703,331 | B2 * | 4/2010 | Magne | E21B 43/01 73/766 |
| 7,720,324 | B2 * | 5/2010 | Haase | G01L 1/246 385/13 |
| 7,796,844 | B2 | 9/2010 | Tam et al. | |
| 8,121,442 | B2 * | 2/2012 | Huffman | G01H 9/004 250/227.14 |
| 8,234,083 | B2 * | 7/2012 | Olesen | G01B 11/18 356/32 |
| 8,714,026 | B2 * | 5/2014 | Froggatt | G01D 5/35306 73/800 |
| 8,733,164 | B2 * | 5/2014 | Olesen | G01P 5/20 73/170.06 |
| 8,861,973 | B2 * | 10/2014 | Tam | B61L 23/041 398/140 |
| 9,063,032 | B2 * | 6/2015 | Appuhamillage | G01M 11/083 |
| 9,090,271 | B2 * | 7/2015 | Bartonek | G01M 7/00 |
| 9,109,883 | B2 * | 8/2015 | Ansari | G01B 11/18 |
| 9,146,097 | B2 * | 9/2015 | Fujita | G01B 11/18 |
| 9,201,089 | B2 * | 12/2015 | Andresen | G01H 9/004 |
| 9,561,812 | B2 * | 2/2017 | Godfrey | B61L 23/044 |
| 9,562,815 | B2 * | 2/2017 | Buck | G01L 1/246 |
| 2003/0141440 | A1 | 7/2003 | Kim et al. | |
| 2005/0163414 | A1 * | 7/2005 | Takeya | G01M 5/0016 385/12 |
| 2006/0214068 | A1 | 9/2006 | Tsai | |
| 2007/0031084 | A1 | 2/2007 | Wang et al. | |
| 2008/0106745 | A1 * | 5/2008 | Haber | G01B 11/18 356/519 |
| 2010/0272384 | A1 * | 10/2010 | Mueller | G01L 1/243 385/13 |
| 2011/0141459 | A1 | 6/2011 | Onoda et al. | |
| 2016/0047095 | A1 * | 2/2016 | Murphy | E01F 15/088 52/27 |
| 2017/0138805 | A1 * | 5/2017 | Jiang | G01L 1/242 |

FOREIGN PATENT DOCUMENTS

| | | |
|---|---|---|
| EP | 1 128 171 A1 | 8/2001 |
| JP | 2000258135 A | 9/2000 |
| JP | 2008 281507 A | 11/2008 |
| JP | 2011 145102 A | 7/2011 |
| KR | 10 2004 0004263 | 1/2004 |
| WO | 2010/021362 A1 | 2/2010 |

* cited by examiner

RAIL MEASURING SYSTEM

CROSS-REFERENCE TO RELATED APPLICATIONS

This continuation application claims priority to PCT/EP2015/050797 filed on Jan. 16, 2015 which has published as WO 2015/110361 A2 and also the German application number 10 2014 100 653.4 filed on Jan. 21, 2014, the entire contents of which are fully incorporated herein with these references.

DESCRIPTION

Field of the Invention

The present invention relates in general to an optical measuring device for detecting measured variables by means of sensors that are embedded in optical fibers, and relates, in particular, to a use of at least one fiber-optic sensor element for measuring a mechanical variable that acts on a rail, and to a rail measuring system. The present invention moreover relates to a method of mounting a fiber-optic sensor element to a rail.

Background of the Invention

Fiber-optic sensors are becoming more and more important in measuring systems. In this connection, one or more sensors that are embedded in fiber optic cables, such as e.g. fiber Bragg gratings, are used in order to detect strain of the optical fiber caused by a mechanical variable and to therewith detect the forces, torques, accelerations, loads, pressure conditions etc.

The sensor elements that are integrated in fiber sensors are irradiated with optical radiation in a suitable wavelength range. The fiber optic cable is strained by the acting force and a reflection or transmission wavelength of the fiber Bragg grating changes. Part of the irradiated light is reflected by the sensor and supplied to an evaluation and analysis unit. The wavelength change based on the acting force can be examined in the analysis unit and be used to detect mechanical influences on the sensor element.

The intensity and/or the wavelength range of the optical radiation reflected by the sensor element or of the optical radiation transmitted through the sensor element comprise features which are influenced by the mechanical variable used. The fiber-optic sensor elements that are integrated in the optical sensor fiber are inter alia sensitive to strain of the sensor fiber, whereby the wavelength spectrum reflected by the sensor element or the wavelength spectrum transmitted through the sensor element is influenced.

Different measuring systems are used in order to monitor various aspects of a rail or track system. In particular, the force exerted on the rail by a passing train is of interest, which allows to draw conclusions not least about the passing train.

For measuring systems for rail or track systems on which trains run, it is moreover a challenge to reliably detect greatly varying axle loads, in particular since the safety requirements demand a very small error rate. Moreover, not only the axle loads introduced into a rail system or track system vary. Also the support of the rails on railway sleepers, the structure of the track bed and the type of trains can vary substantially. This represents great challenges for a measuring system.

Moreover, strain of the optical fiber and therefore of the optical sensor element in the fiber and/or changes in the fiber Bragg grating structure do not only depend on the mechanical variable to be measured, such as e.g. the force, but can also be influenced by undesired disturbance variables such as e.g. temperature fluctuations. For this reason, it is desired to eliminate or at least suppress disturbance variables that have an effect on the measurement accuracy in the detection of the desired variables.

For this reason, it is desirable to provide an improved measuring system for rail or track systems, an improved fiber-optic sensor unit for rail or track systems, as well as an improved use of the fiber-optic sensor unit.

SUMMARY OF THE INVENTION

The present invention provides a use of at least one fiber-optic sensor element for measuring a mechanical variable which acts on a rail, a fiber-optic sensor unit for detecting a mechanical variable that acts on a rail, a rail measuring system and a method of mounting a fiber-optic sensor element to a rail in accordance with the independent claims.

In accordance with one embodiment, a use of at least one fiber-optic sensor unit is provided for measuring a mechanical variable that acts on a rail with a longitudinal extension and a neutral axis which extends along the longitudinal extension, wherein the use comprises provision of the at least one fiber-optic sensor unit at an angle of 30° to 60°, in particular 45°, relative to the neutral axis or at an angle of −30° to −60°, in particular −45°, relative to the neutral axis, irradiation of the at least one fiber-optic sensor unit with primary light for generating a signal light in reflection mode or transmission mode, detection of the intensity of the signal light and evaluation of the signal light.

In accordance with a further embodiment, a fiber-optic sensor unit is provided for detecting a mechanical force that acts on the rail, wherein the fiber-optic sensor unit comprises an optical fiber, a fiber Bragg grating which is provided in the optical fiber and has a Bragg wavelength that depends on the mechanical force, a converter structure, wherein the converter structure comprises a signal amplification lever, and an edge filter for filtering the first part of the signal light, in particular, wherein the edge filter has a filter characteristic line with a nominal slope of 8% per nm related to the transmitted intensity or less, in particular between 2% and 7% per nm, in particular wherein a measuring range of axial loads of 200 kg to 50,000 kg that act on the rail is provided.

In accordance with a further embodiment, a rail measuring system is provided, wherein the rail measuring system comprises a rail with a longitudinal extension and a neutral axis extending along the longitudinal extension on which rail a mechanical force generated by a passing train acts, and at least one fiber-optic sensor unit, typically two fiber-optic sensor units, for detecting the mechanical force that acts on the rail, wherein a fiber-optic sensor unit comprises a fiber Bragg grating which has a Bragg wavelength which depends on the mechanical variable and wherein the at least one fiber-optic sensor unit is mounted to the rail at an angle of 30° to 60°, in particular 45°, relative to the neutral axis or at an angle of −30° to −60°, in particular −45°, relative to the neutral axis of the rail.

In accordance with a further embodiment, a method is provided for mounting a fiber-optic sensor unit, in particular a fiber-optic sensor unit comprising a fiber Bragg grating, to a rail, wherein the method comprises mounting the fiber-optic sensor unit at a further angle of 30° to 60°, in particular 45°, relative to the neutral axis or at a further angle of −30° to −60°, in particular −45°, relative to the neutral axis of the rail, in particular wherein the fiber-optic sensor unit is mounted approximately at the neutral axis.

In accordance with a further embodiment, a use of at least one fiber-optic sensor unit is provided for measuring a mechanical variable that acts on a rail with a longitudinal extension and a neutral axis extending along the longitudinal extension, wherein the use comprises provision of the at least one fiber-optic sensor unit at the neutral axis, in particular such that the fiber-optic sensor unit crosses the neutral axis, irradiation of the at least one fiber-optic sensor unit with primary light for generating a signal light in reflection mode or transmission mode, detection of the intensity of the signal light, and evaluation of the signal light.

In accordance with a further embodiment, a rail measuring system is provided, wherein the rail measuring system comprises a rail with a longitudinal extension and a neutral axis extending along the longitudinal extension, on which a mechanical force generated by a passing train acts, and at least one fiber-optic sensor unit, typically two fiber-optic sensor units for detecting the mechanical force acting on the rail, wherein a fiber-optic sensor unit has a fiber Bragg grating which has a Bragg wavelength that depends on the mechanical variable, and wherein the at least one fiber-optic sensor unit is mounted at the neutral axis, in particular such that it crosses the neutral axis.

In accordance with a further embodiment, a method is provided for mounting a fiber-optic sensor unit, in particular a fiber-optic sensor unit comprising a fiber Bragg grating, to a rail, wherein the method comprises mounting the fiber-optic sensor unit at the neutral axis of the rail, in particular such that the fiber-optic sensor unit crosses the neutral axis.

In accordance with a further embodiment, a measuring method is provided for measuring a mechanical variable which acts on a rail with a longitudinal extension and a neutral axis extending along the longitudinal extension, wherein the method comprises irradiation of at least one fiber-optic sensor unit with primary light for generating a signal light in reflection mode or transmission mode, detection of the intensity of the signal light and evaluation of the signal light, wherein in particular with the signal light clipping occurs which is used for evaluating the signal light.

BRIEF DESCRIPTION OF THE DRAWINGS

Embodiments are illustrated in the drawings and explained in more detail in the following description. In the drawings.

Identical reference numerals in the drawings characterize identical or functionally similar components or steps.

DETAILED DESCRIPTION OF THE PREFERRED EMBODIMENTS

Figure 1:
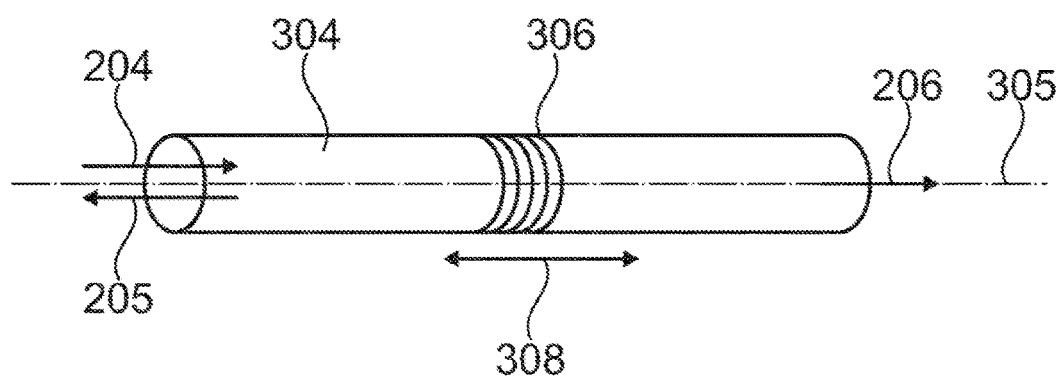
FIG. 1 shows a sensor fiber containing an integrated sensor element designed as a fiber Bragg grating for measuring fiber strain.

The following is a detailed description of various embodiments of the invention, wherein one or a plurality of examples are illustrated in the drawing.

Embodiments of the present invention which are described herein relate inter alia to a use of at least one fiber-optic sensor unit for measuring a mechanical variable, a fiber-optic sensor unit for detecting a mechanical force acting on the rail, a rail measuring system and a method for mounting a fiber-optic sensor unit, in particular a fiber-optic sensor unit with a fiber Bragg grating, to a rail.

FIG. 1 illustrates a sensor or a sensor element 303 which is integrated in a fiber optic cable and comprises a fiber Bragg grating 306. Although FIG. 1 shows only one single fiber Bragg grating 306, it is clear that the present invention is not limited to data acquisition from one single fiber Bragg grating 306 but that a plurality of fiber Bragg gratings 306 can be arranged along a transmission fiber or a sensor fiber 304.

FIG. 1 thus only shows a section of an optical waveguide which is designed as sensor fiber 304, wherein this sensor fiber 304 is sensitive to fiber strain 308. It should be mentioned in this connection that the term "optical" or "light" shall refer to a wavelength range in the electromagnetic spectrum which may extend from the ultraviolet spectral range via the visible spectral range to the infrared spectral range. A center wavelength of the fiber Bragg grating 306 i.e. a so-called Bragg wavelength AB is obtained by the following equation:

$$\lambda_B = 2 \cdot n_k \Lambda$$

$n_k$ is here the effective refractive index of the basic mode of the core of the sensor fiber 304 and $\Lambda$ is the spatial grating period (modulation period) of the fiber Bragg grating 306.

A spectral width given by a full width at half maximum of the reflection response depends on the dimensions of the fiber Bragg grating 306 along the sensor fiber 304. Due to the action of the fiber Bragg grating 306, the light propagation within the sensor fiber 304 thus e.g. depends on forces, moments and mechanical tensions as well as temperatures, which act on the sensor fiber 304 and in particular on the fiber Bragg grating 306 within the sensor fiber 304.

As is illustrated in FIG. 1, measuring light 204 enters the sensor fiber 304 from the left-hand side, wherein part of the measuring light 204 exits as transmitted light 206 with a wavelength dependence that is different from the measuring light 204. It is also possible to receive reflected light 205 at the input end of the fiber (i.e. at the end at which the measuring light 204 is also irradiated), wherein the reflected light 204 also shows a modified wavelength distribution as illustrated e.g. in FIG. 2 (sensor reflection response).

Figure 2:
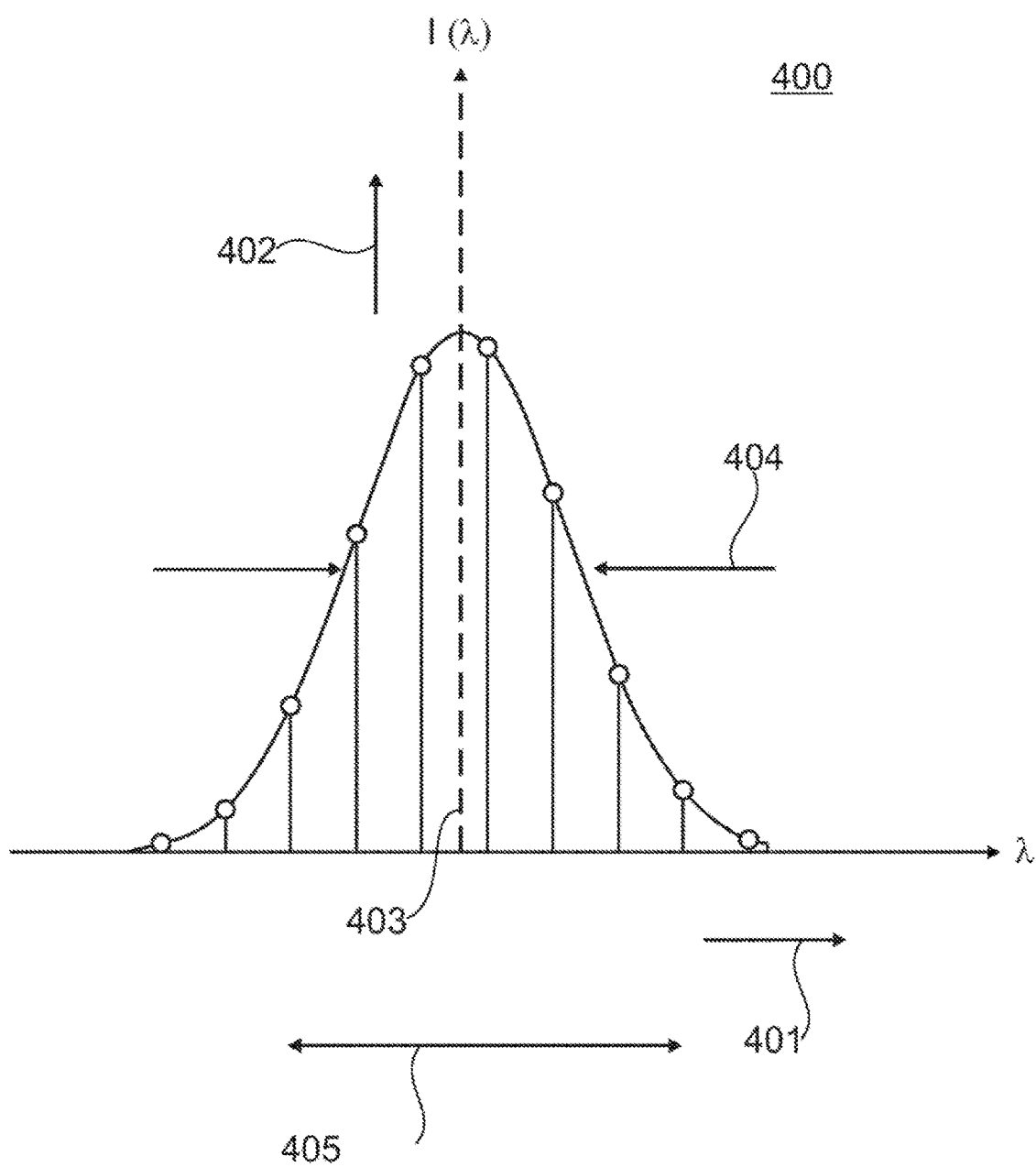
FIG. 2 shows a sensor reflection response caused by an integrated sensor element within the fiber illustrated in FIG. 1.

In a case in which the measuring light 204 is irradiated in a wide spectral range, a transmission minimum in the transmitted light 206 at the position of the Bragg wavelength (an inverted dependence as compared with the dependence illustrated in FIG. 2, i.e. maximum absorption at the Bragg wavelength) is the result. A reflection maximum is obtained at this position in the reflected light, which is explained below with reference to FIG. 2.

FIG. 2 schematically represents a sensor reflection response 400 which is received when broad-band measuring light 204 is irradiated and when the center wavelength of the fiber Bragg grating 306 (FIG. 1), i.e. the Bragg wavelength $\lambda_B$, corresponds to the dashed line 403. The sensor reflection response 400 may have a symmetrical curve with respect to the center wavelength 403, wherein the curve has a full width at half maximum (FWHM) 404, i.e. a spectral width at half the maximum intensity.

FIG. 2 schematically shows spatial scanning points (circles). The evaluation of the modified secondary light 203 recorded by the detector unit 104 now allows to obtain the curve shown in FIG. 2, i.e. the sensor reflection response 400, as a function of a wavelength $\lambda$. FIG. 2 thus shows an intensity distribution $I(\lambda)$, i.e. the intensity reflected by the sensor element 303 is illustrated as a function of the wavelength $\lambda$. A wavelength distribution to be detected by the measuring device is obtained through a wavelength response range 405 which is illustrated by the double arrow in FIG. 2. Modified secondary light 203 shows wavelength components in this range when the fiber Bragg grating 306 is measured. The modified secondary light 203 then corresponds to the sensor reflection response 400 illustrated in FIG. 2, i.e. a reflection intensity 402 is recorded as a function of the wavelength 401.

Figure 3:
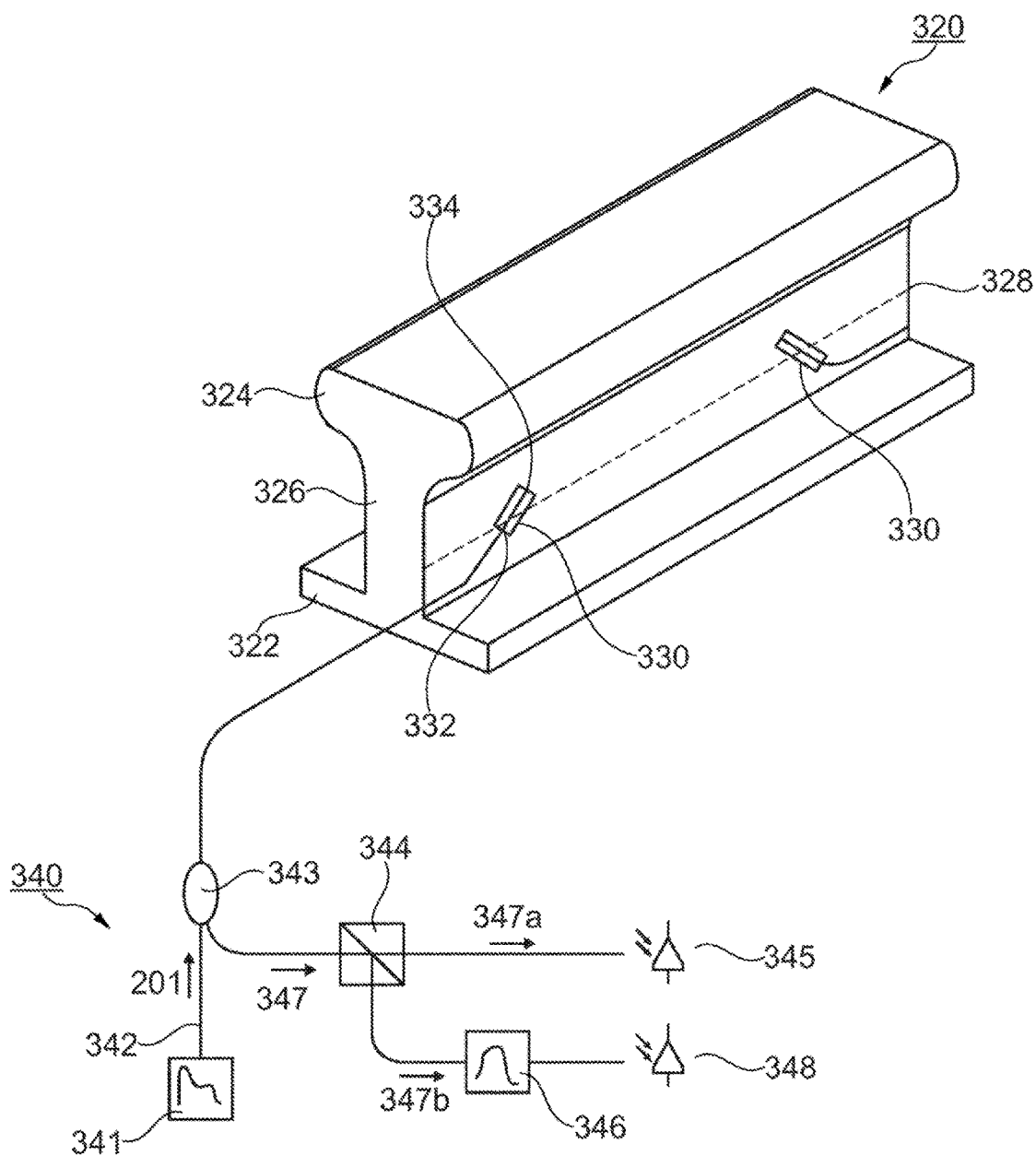
FIG. 3 shows a schematic block diagram of a fiber-optic measuring device with light source, fiber coupler and detection configuration or a fiber-optic sensor unit or a rail measuring system in accordance with embodiments of the present invention.

FIG. 3 shows a schematic block diagram of a fiber-optic measuring device with light source, fiber coupler and detection arrangement or a fiber-optic sensor unit or a rail measuring system in accordance with embodiments of the present invention. FIG. 3 shows a rail 320, a fiber-optic sensor unit 330 mounted to the rail and an optical measuring device 340. The fiber-optic sensor unit 330 may in this case be the sensor unit 303 illustrated in FIG. 2 or be similar to that.

The rail 320 can approximately be regarded as a bar. A bar is in general a rod-shaped support member which can be loaded by loads in a direction transverse to its axis. The bar reacts to the loads with bending and shear deformation. If e.g. a force acts on a contact surface of the bar, the bar is deformed due to the bending deformation to such an extent that a first area facing the contact surface is contracted (negative strain) and a second area facing away from the contact surface is expanded (positive strain). There is an area between these areas which does not experience any strain by this bending motion. It is designated as a neutral axis. The above-mentioned shear deformation exists in addition to the bending motion.

The rail 320 illustrated in FIG. 3 has a foot 322 in a lower section and a head 324 in an upper section. Between these, an approximately rectangular area 326 is formed. If a mechanical variable acts on the rail 320, the rail 320 is deformed, thereby forming a neutral axis 328 as described above. The rail 320 is preferably designed such that the neutral axis 328 is formed in the rectangular area 326.

In accordance with some embodiments, the fiber-optic sensor unit confines an angle of greater or smaller than 0° with the neutral axis. The fiber-optic sensor unit can preferably be arranged at an angle of 30° to 60°, in particular 45°, relative to the neutral axis or at an angle of −30° to −60°, in particular −45°, relative to the neutral axis.

Mounting the fiber-optic sensor unit 330 at an angle of ±30° to ±60°, in particular ±45°, relative to the neutral axis offers the advantage that the fiber-optic sensor unit detects shear deformations which cause a positive or negative strain, which do not extend in parallel with the neutral axis.

In accordance with some embodiments, the fiber-optic sensor unit may be mounted at the neutral axis, in particular, extend over it such that the optical sensor unit is mounted to the rail at two positions such that the sensor unit crosses the neutral axis, i.e. one mounting point is arranged on one side of the neutral axis and the other mounting point is arranged on the opposite side of the neutral axis. Moreover, the mounting points may, in particular be arranged at the same distance from the neutral axis, i.e. be arranged symmetrically, in particular point-symmetrically, relative to the neutral axis.

In FIG. 3, the fiber-optic sensor unit 330 is mounted to the rail 320 via two mounting points 332, 334 which e.g. are located at the same distance from the neutral axis. For this reason, the bending deformations caused by a mechanical variable acting on the rail at the mounting points 332, 334 cancel one another, whereby the shear deformation is measured substantially directly or substantially without interference.

In accordance with some embodiments which can be combined with other embodiments, the fiber-optic sensor unit may substantially be arranged at or on top of the neutral axis or extend over it, i.e. cross it. In accordance with some embodiments which can be combined with other embodiments, the fiber-optic sensor unit can be arranged at an angle of 30° to 60°, in particular 45°, relative to the neutral axis or at an angle of −30° to −60°, in particular −45°, relative to the neutral axis. In particular, the fiber-optic sensor unit can substantially be arranged at or on top of the neutral axis or extend over it, i.e. cross it and be arranged at an angle of 30° to 60°, in particular 45°, relative to the neutral axis or at an angle of −30° to −60°. With this type of mounting, only shear deformations are introduced into the sensor. These are independent of the curvature of the rail and for this reason independent of the exact support of the rail on the track bed and the railway sleepers.

The optical measuring device illustrated in FIG. 3 comprises a primary light source 341, a fiber coupler 343 and a photo detector 345. An optical transmitting fiber 342 is provided between the primary light source 341 and the fiber coupler 343. The fiber coupler 343 directs the primary light 201 of the primary light source 341 onto the fiber-optic sensor unit 330. The sensor reflection response 400, i.e. the signal light reflected by the fiber-optic sensor unit 330 in dependence on the mechanical variable acting on the rail 150 is, in turn, transmitted to the fiber coupler 343. The reflected light or part of the reflected light is supplied as secondary light 347 or signal light 347 to the photo detector 345 in the fiber coupler 343. A detector detects the intensity distribution, preferably the intensity of the signal light. For example, the detector resolves a change in the center wavelength 403 of the secondary light 347 reflected back by the fiber-optic sensor unit.

Moreover, a beam splitter 344 may be provided between the fiber coupler 343 and the photo detector 345, which splits the light incident on it and guides a first part 347a to a photo detector 345 and guides a second part 347b via a filter 346 to a second photo detector 348. The filter 346 is preferably designed as an edge filter.

The evaluation of the signals on the first photo detector 345 and/or on the second photo detector 348 is performed in an evaluation unit which is not shown and in which, in particular, the signal light can be evaluated. For example, the signals can be processed or computed. The first and/or the second photo detector is/are advantageously designed as photo diode, photo multiplier, avalanche photo diode or the like. Photo detectors of this type convert the incoming signal light into a photocurrent which permits quick and simple evaluation. For example, a difference of the signals generated at the photo detectors 345, 348 designed as photo diodes can be generated.

In accordance with typical embodiments, a detector can spectrally integrate the signal light i.e. can detect the intensity, e.g. downstream of the edge filter, without spectral resolution. The optical signals of the photo diodes can be read out downstream of the edge filter in a high-frequency manner, in particular higher than 5 kHz, advantageously higher than 8 kHz, typically higher than 10 kHz, since a simple scan of the photocurrents is performed. Alternatively, detection can also be performed by means of a spectrometer or the like in order to determine the spectrum of the wavelength distribution reflected back by the fiber-optic sensor unit 330. However, the use of photo detectors, in particular photo diodes, offers the advantage of high-frequency scanning with a simple measurement configuration. Moreover, a change in the dynamic range can be effected through selection of a slope of the filter characteristic line of the edge filter. The nominal slope of the filter characteristic line is thereby advantageously smaller than 8% nm, and is in particular in a range between 2% and 7% related to the transmitted intensity. The nominal slope thereby designates the average slope of the edge filter, the slope in an important/main area of the edge filter or a slope which is characteristic for the edge filter as it is mentioned e.g. as representative value in order to compare various edge filters with respect to their slope. Moreover, a typical center wavelength 403 of the light reflected back by the fiber Bragg grating 306 is approximately 1550 nm. Further aspects of the change of the dynamic range are illustrated with reference to FIGS. 5A and 5B.

The fiber Bragg grating signal, i.e. the signal change of the fiber-optic sensor unit caused by the mechanical variable acting on the rail can be read out by means of the just illustrated edge filter configuration, whereby a high-frequency measurement can be performed.

FIG. 3 moreover illustrates two fiber-optic sensor elements. In accordance with some embodiments, a second or further fiber-optic sensor unit is provided at an angle of 30° to 60°, in particular 45°, relative to the neutral axis or at a further angle of −30° to −60°, in particular −45° relative to the neutral axis in order to enlarge the range of applications. This is illustrated in connection with FIG. 4. In particular, the sign of the further angle of the further fiber-optic sensor unit differs from the sign of the angle of the fiber-optic sensor unit. In this connection, by adding these two signals a signal can be provided which is proportional to the load on the rail.

It shall be pointed out that although in FIG. 3 the use of two fiber-optic sensor units is illustrated, it is possible to use three or more fiber-optic sensor units in order to e.g. increase the measuring accuracy. In accordance with some embodiments, further fiber-optic sensor units, i.e. a third or a fourth sensor unit, may also be arranged at the above-described angles. However, they may also be arranged at different angles such as e.g. 0° or 90° relative to the neutral axis.

The primary light can be intensity-modulated prior to irradiation of the fiber-optic sensor units by the primary light source 341 in order to eliminate or at least reduce undesired interferences by e.g. a lock-in technology. In case of an intensity modulation of the primary light 201 by the primary light source 341, the modulation frequency can be provided for the photo detectors in order to enable synchronized detection in the photo detectors.

It should furthermore be noted that although measurement in reflection mode is illustrated in FIG. 3, the fiber-optic sensor units designed as fiber Bragg grating can also be operated in transmission mode such that transmitted primary light 201 is supplied to the optical measuring device as secondary light (transmitted secondary light) 202.

Figure 4:
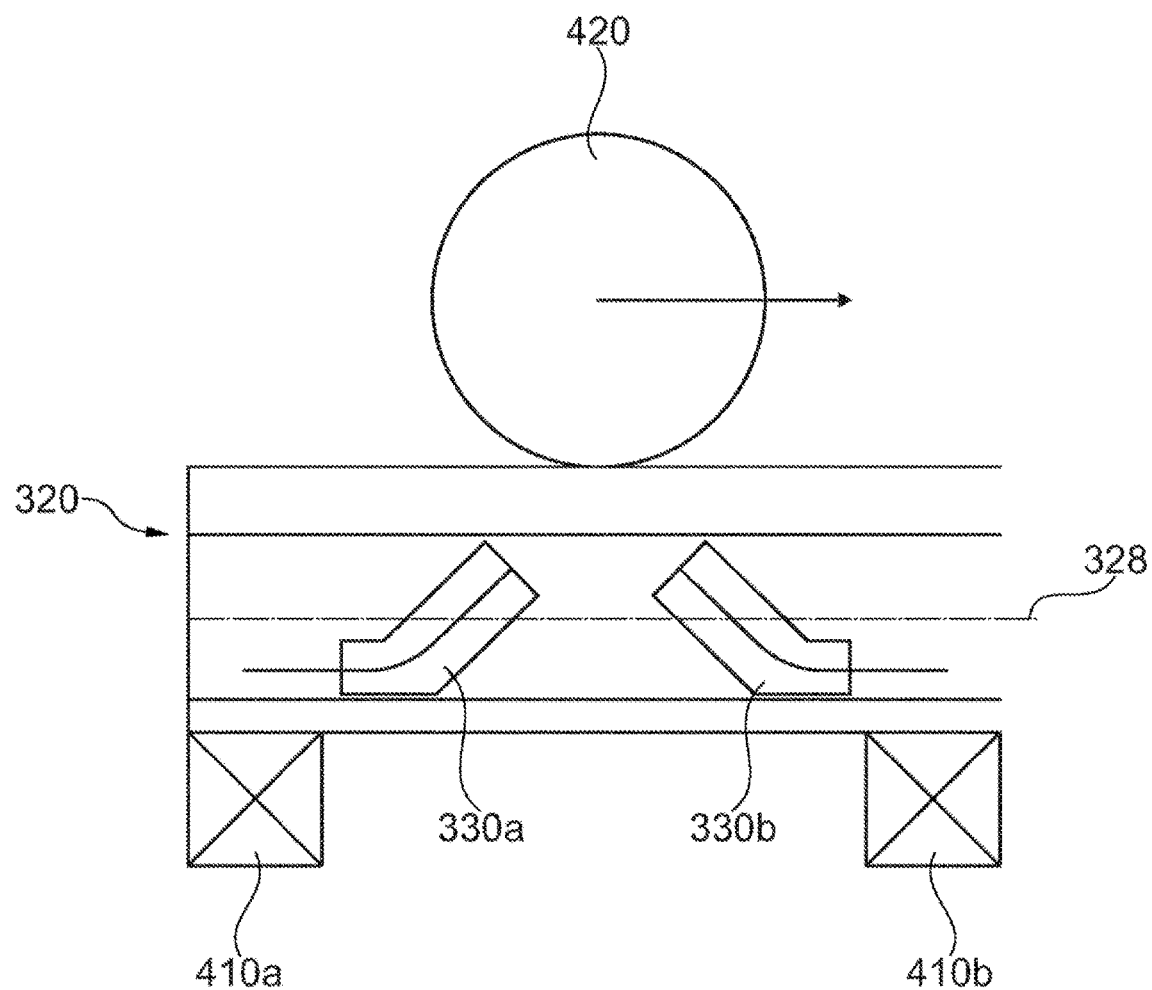
FIG. 4 shows a schematic diagram of a rail measuring system in accordance with further embodiments.

FIG. 4 shows a schematic view of a rail measuring system in accordance with a further embodiment. It should be mentioned here that components that have already been described with reference to FIG. 3 are not again mentioned herein in order to avoid redundant description. As is illustrated in FIG. 4, the rail measuring system comprises the rail 320 and at least one fiber-optic sensor unit 330. The rail 320 is supported on a plurality of railway sleepers. FIG. 4 shows two railway sleepers 410a, 410b between which at least one fiber-optic sensor unit is arranged, typically two fiber-optic sensor units 330a, 330b. In accordance with the embodiments described herein, at least one sensor unit 330, in particular at least two sensor units can be mounted to the rail such that they confine an angle of ±30° to ±60°, typically ±45°, with the neutral axis. In accordance with another embodiment, the at least one fiber-optic sensor unit 330 preferably extends over the neutral axis in a symmetrical, in particular point-symmetrical, manner. This means, it is mounted to the rail 320 via two mounting points 332, 334 which have an identical distance from the neutral axis. Reference numeral 420 moreover exemplarily shows the wheels of a train running on the rail 320.

The passing train exerts a force on the rail 320 with its wheels 420, as a consequence of which the rail 320 is deformed as discussed above. For this reason, the at least one fiber-optic sensor unit is strained in a positive or negative manner. This changes the wavelength distribution reflected or transmitted by the at least one fiber-optic sensor unit. It is detected and evaluated as measuring signal in order to be able to draw conclusions about the passing train. E.g. the shear deformation caused by the train running on the rail can be determined.

In accordance with some embodiments, at least one fiber-optic sensor unit can be provided at one measuring position. Evaluation of the measuring signal can thereby be used for axle counting. The measuring signal corresponds here to the light reflected and/or transmitted by the fiber-optic sensor unit, i.e. the signal light.

In accordance with other embodiments as illustrated in FIG. 4, at least two fiber-optic sensor units can be provided at two measuring positons. Alternatively or additionally, a fiber-optic sensor unit may also comprise two or more optical fibers with fiber Bragg grating which can be mounted to the same or different measuring positons. Each fiber-optic sensor unit can thus have at least one fiber Bragg grating provided in an optical fiber, which has a Bragg wavelength that depends on the acting mechanical variable. Evaluation of the measuring signals of the at least two fiber-optic sensor units or of the at least one fiber-optic sensor unit with at least two fiber Bragg gratings can comprise determination of the load on the rail, measurement of the speed, detection of the direction of passing trains, wheel damages of trains on the rail and/or train classification of passing trains.

In FIG. 4, two fiber-optic sensor units 330a, 330b are mounted to two measuring positions on the rail 320. The rail 320 can thereby be divided into three sections. A first section is arranged in the vicinity of the first railway sleeper 410a and between the first and the second railway sleeper 410a, a second section is arranged between the first and the second railway sleeper 410a, 410b and a third section is arranged in the vicinity of the second railway sleeper 410b and between the first and the second railway sleeper 410a, wherein the second section is located between the first and the third section. For example, the first, the second and the third section divide the area between two railway sleepers into identically sized thirds. The first fiber-optic sensor unit 330a is preferably mounted in the first section and the second fiber-optic sensor unit 330b is preferably mounted in the third section. In accordance with some embodiments which can be combined with other embodiments, the fiber-optic sensor units may also be in the area of the railway sleeper, i.e. closer than in an area of 30% of the separation between the railway sleepers. The first and/or the third section can e.g. cover 15% of the area between two railway sleepers and the second section 70% of the area between two railway sleepers. As is illustrated in FIG. 4, the first fiber-optic sensor unit 330a confines a positive angle with the neutral axis 326 and the second fiber-optic sensor unit 330b subtends a negative angle with the neutral axis 326. In particular, the first and the second fiber-optic sensor unit 330a, 330b can have an angle of the same amount but different signs. The first and the second fiber-optic sensor units 330a, 330b are typically arranged in a mirror-symmetrical manner.

In accordance with some embodiments, the at least one fiber-optic sensor unit is provided with a variable angle relative to the neutral axis which changes with the separation between the fiber-optic sensor unit and the railway sleeper. In particular, the variable angle is steeper when the fiber-optic sensor unit is arranged close to the railway sleeper, and becomes flatter the further in the middle the fiber-optic sensor unit is arranged between two neighboring railway sleepers. This offers the advantage that the fiber-optic sensor unit can be oriented towards the shearing stress acting in different directions along the rail.

In accordance with some embodiments, an evaluation of a high-frequency measuring signal can be performed in order to be able to detect passing high-speed trains. In this case, measuring rates of more than 5 kHz, typically more than 8 kHz, in particular more than 10 kHz, are advantageous. The optical signals can typically also be read out in a high-frequency manner downstream of the edge filter since a simple electrical scan of the photocurrents is performed.

By mounting the optical fiber or the fiber-optic sensor unit at an angle relative to the neutral axis of typically 30° to 60°, in particular 45°, such that the optical fiber or the fiber-optic sensor unit centrally extends over the neutral axis of the rail, only shear deformations are introduced into the sensor. These are independent of the bend of the rail and therefore independent of the exact support of the rail on the track bed and the railway sleepers. By using two parallel measuring systems of this type and mounting the sensors at angles with different signs close to one another as well as adding these two signals, it is possible to generate a signal proportional to the load on the rail.

Moreover, passing trains exert axial loads of 200 kg up to 50,000 kg on exactly the same rail, which causes a high dynamic range (large measuring range). The high dynamic range requires the measuring signal to be clearly distinguished from the background of the measurement uncertainty (high signal-to-noise ratio) in order to be able to also reliably detect small signals (safety requirements of more than 1 ppm error rate). With small signals, there is the problem of a polarization error during measurement by means of fiber Bragg grating sensors. This error represents an inherent measuring error of the system and is a fixed value for these measuring systems which is predetermined by the fiber Bragg grating sensor used. Since the signal height is fixedly predetermined by the strains on the rail, this signal to measurement uncertainty ratio cannot be simply overcome. For this reason, very small axle loads cannot be safely detected. Consequently, some embodiments of the present invention propose amplification of the existing strain on the rail by means of a suitable lever structure or converter structure.

Figure 5A:
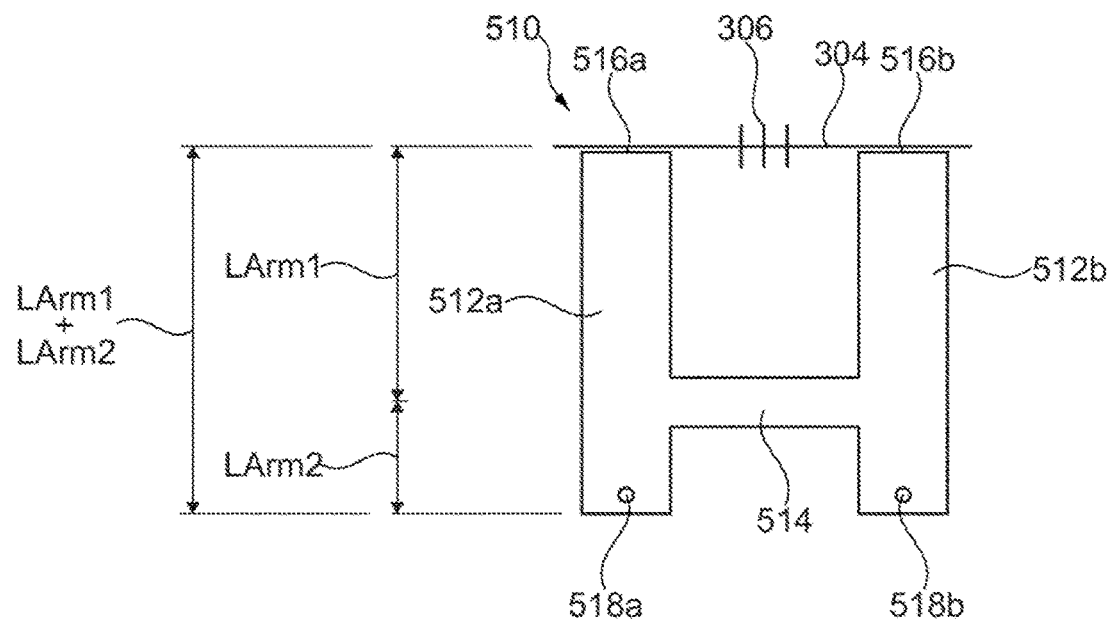
FIGS. 5A and 5B show schematic diagrams of a converter structure used in a sensor element, which can be used in a sensor unit or rail measuring system in accordance with embodiments of the present invention.
Figure 5B:
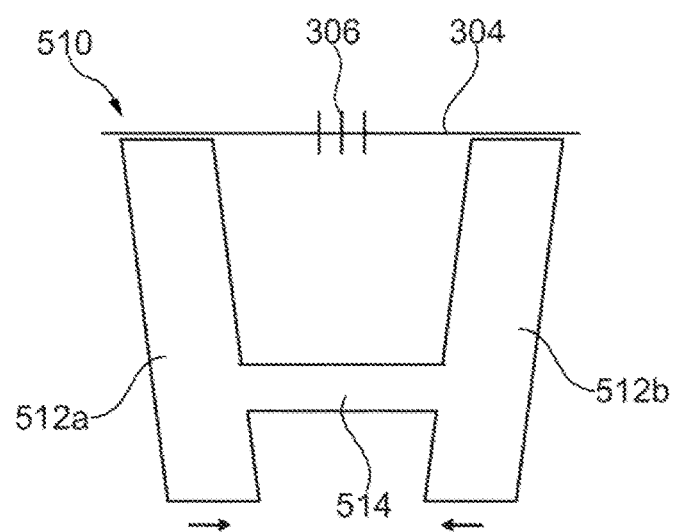

FIGS. 5A and 5B illustrate schematic views of a converter structure used in a fiber-optic sensor unit in accordance with a further embodiment.

As is illustrated in FIG. 5A, the converter structure 510 has an H-shaped structure, however, without being confined thereto. The converter structure may in principle have any suitable shape as long as it provides an amplification of the strain of the rail to the optical fiber with the fiber Bragg grating in order to increase the sensitivity. The converter structure illustrated in FIG. 5A has two spaced-apart rods 512a, 512b and a bar 514 connecting the rods 512a, 512b. The bar 514 represents at the same time the fixed point or pivot point of the converter structure, about which the converter structure rotates when force is applied.

An optical fiber 304 with a provided fiber Brag grating 306 is clamped at two suspension points 516a, 516b in a first section between the two rods 512a, 512b. The converter structure 510 is mounted to the rail 320 via two mounting points 518a, 518b provided in a second section. A first lever arm with the length larm1 is correspondingly determined by the separation between the suspension points 516a, 516b and the bar 514 and a second lever arm with the length larm2 is determined by the separation between the mounting points 518a, 518b and the rod 514. The lever ratio k thus results in k=larm1/larm2. Even if the lever ratio has been defined over two distances, the lever ratio may also be negative, if, as illustrated e.g. in FIGS. 5A and 5B, the fixed point or pivot point of the converter structure is arranged between the mounting points of the converter structure for mounting to the rail and the suspension points of the fiber at the converter structure. If the mounting points of the converter structure for mounting to the rail and the suspension points of the fiber at the converter structure are arranged on the same side of the fixed point or pivot point of the lever, the lever ratio is positive. The arrangement of the fixed point or pivot point of the converter structure relative to the mounting points on the rail and the suspension points for the optical fiber thus decides about the sign of the lever ratio. The amount of the lever ratio k is advantageously larger than 1, in particular larger than 2, preferably between 2 and 3.

FIG. 5B shows the converter structure when the rail expands, e.g. under the influence of a mechanical force or temperature change. As is illustrated in FIG. 5B, the separation between the mounting points 518a, 518b changes, which leads to a change in separation between the suspension points 516a, 516b. The amount of the lever ratio is advantageously larger than 1, in particular larger than 2, preferably between 2 and 3. For this reason, the optical fiber 304 is strained more (positively or negatively) than the rail 320, which amplifies the measuring signal. For this reason, the signal to measurement uncertainty ratio is increased, for which reason also small signals can be reliably detected.

In accordance with typical embodiments which can be combined with other embodiments, the amount of the amplification or the lever ratio k is greater than 1. The transmission ratio may be negative as illustrated e.g. in FIGS. 5A and 5B or may be positive, in particular when the mounting points of the converter structure for mounting to the rail and the suspension points of the fiber are arranged on the converter structure on the same side of the fixed point or pivot point of the lever. FIGS. 5A and 5B illustrate an exemplary arrangement. Further designs of levers are also possible within the scope of the embodiments described herein, wherein the amount of k is larger than 1 and, in particular the temperature compensation described below is made possible. In dependence on the shape of the lever, e.g. in dependence on whether the transmission ratio is positive or negative, the fiber can be mounted between the suspension points 516a, 516b with more or less pretension.

This also leads to an increase in sensitivity. In accordance with some embodiments, the slope of the edge filter can be selected to be correspondingly flat. It may have, in particular a nominal slope of less than 8% per nm, in particular between 2% and 7% per nm, related to the transmitted intensity in order to cover the overall measuring range or dynamic range. Thus, within the scope of the embodiments described herein, the sensitivity is increased by the converter structure and the measuring range is also increased by the flat slope of the edge filter described herein. This permits secure measurement of greatly varying axle loads.

The optical and electric arrangement illustrated in FIGS. 3 and 4 thus provides a measuring system on the basis of fiber Bragg grating sensors, which can convert a mechanical variable into an electric signal by means of optical elements. Moreover, the mechanically acting variable can be amplified via a converter structure illustrated in FIG. 5 which causes a change of the optical signal which can be noted by an increased sensitivity which must be evaluated by electronics. Thus, the requirements for the evaluation unit with respect to the measuring range are increased, however, the signal is provided with a better signal-to-noise ratio which leads to a smaller error rate. The measuring range of the measuring device is typically adjusted by adjusting the filter edge such that it matches the new dynamic range of the extension signal. In some embodiments, the filter characteristic line of the filter in the measuring device is flattened, e.g. to 8% per nm or less, in particular to a value between 2% and 7% per nm, related to the transmitted intensity. For this reason, measurement errors of the measuring device are further reduced.

In accordance with some embodiments, the measuring signal can be amplified by the converter structure also to such an extent that the measuring signal leaves the measuring range at high loads. In this case, clipping of the measuring signal is performed. In this case, the correct measured value for the axle load can indeed no longer be quantitatively detected but a qualitative statement can be made. The evaluation unit can e.g. generate an output which corresponds to passage of a train with a weight which is larger than a predetermined value. Such a signal can furthermore be used for axle counting.

Clipping can be performed e.g. when the measuring signal leaves the filter range of the edge filter, i.e. when it is no longer filtered or changed by the edge filter such that a differential evaluation with the unfiltered signal no longer shows any quantitative difference. This is e.g. the case when a train with such a high axle load passes the fiber-optic sensor unit or stops in the area of the fiber-optic sensor unit such that the generated measuring signal is in an area of the edge filter in which the latter has no relevant slope any more.

Moreover, a type of clipping can also occur in the optical fiber 304. In some embodiments, it is suspended with a pretension between the suspension points of the converter structure or on the rail such that also contractions (negative strain) lead to a measuring signal. The pretension may thereby be selected such that starting with the occurrence of a predetermined mechanical force, the optical fiber 304 experiences such high contractions that the pretension is exhausted and the optical fiber 304 sags in particular. In this case, a quantitative statement is no longer possible. However, a measuring signal corresponding to the passing train is still generated. This signal can e.g. be used for performing axle count or determining the speed. The pretension of the optical fiber is typically selected such that the changes in length of the optical fiber 304 caused by the mechanical variable, in particular of the fiber Bragg grating 306, cause a wavelength change in a range of 5 nm to 10 nm, preferably smaller than 12 nm. If the length changes to be expected are e.g. on the border or outside of the range, the just described type of suspension of the optical fiber offers the advantage that the mechanical load of the optical fiber can be reduced since it no longer has to follow the great length changes in case of high loads.

In accordance with one embodiment, a measuring method with a sensor unit in accordance with embodiments described herein or with a rail measuring system in accordance with the embodiments described herein can be provided, wherein in a first measuring range, a signal is generated which is proportional to the axle load and in a second measuring range, in particular for axle loads higher than in the first measuring range, a signal is generated which is not proportional to the axle load, e.g. a signal that merely shows the existence of an axle load. The second area can be realized by clipping according e.g. to one of the above-mentioned aspects.

The above described length changes need not comprise the overall dynamic range of the optical fiber 304 or of the fiber Bragg grating 306. The optical fiber 304 is typically pretensioned to such an extent that without influence of a mechanical variable from the outside, e.g. the mechanical variable exerted by a passing train, the center wavelength 403 is approximately in the center of the available dynamic range in order to e.g. be able to compensate for a temperature change.

The converter structure can moreover be used for temperature compensation through suitable selection of the materials and dimensions, in particular together with the selection of a suitable pretension for the optical fiber. Temperature changes cause strain to the rail. This strain can generate an offset or displacement of the signal and result in measuring errors. For this reason, temperature compensation is advantageous for absolute measurement applications such as e.g. load measurement and train weighing.

In accordance with some of the above-described embodiments, temperature compensation can be achieved by adjusting the expansion coefficient of the lever. In this connection, the geometry and the material of the lever are selected in such a manner that the strain of the fiber and of the rail are compensated to just zero. In accordance with some embodiments, for temperature compensation, the expansion coefficient of the converter structure of a converter structure with negative transmission ratio is smaller than the expansion coefficient of the rail. In accordance with other embodiments, for temperature compensation, the expansion coefficient of the converter structure of a converter structure with positive transmission ratio is larger than the expansion coefficient of the rail.

Although the present invention has been described above with reference to typical embodiments, it is not limited thereto but can be modified in a plurality of ways. The invention is not limited to the mentioned applications either.

What is claimed is:

1. A method of measuring a shear deformation which acts on a rail with a longitudinal extension using at least one fiber optic sensor unit, the shear deformations caused by a train running on the rail, the rail having a neutral axis which extends along the longitudinal extension, wherein the areas above and below the neutral axis do experience the shear deformation, wherein the neutral axis does not experience the shear deformation, the method comprising the steps of:
provide at least one fiber-optic sensor unit across the neutral axis at a positive first angle of 30° to 60° relative to the neutral axis or at a negative angle of −30° to −60° relative to the neutral axis, wherein the at least one fiber-optic sensor unit is mounted to the rail, wherein one mounting point of the fiber-optic sensor unit is disposed on one side of the neutral axis and another mounting point is disposed on an opposite side of the neutral axis;
irradiating the at least one fiber-optic sensor unit with a primary light for generating a signal light in a reflection mode or a transmission mode: detecting an intensity of the signal light;
evaluating a wavelength change between the signal light and the primary light; and
determining the shear deformation based on the wavelength change.

2. The method according to claim 1, wherein the step of providing the at least one fiber-optic sensor unit is at the positive angle of 45° relative to the neutral axis or at the negative angle of −45° relative to the neutral axis.

3. The method according to claim 1, wherein the step of evaluating includes counting of axles that run over the at least one fiber-optic sensor unit.

4. The method according to claim 1, further including the step of providing a second fiber-optic sensor unit at a positive second angle of 30° to 60° relative to the neutral axis or at a negative second angle of −30° to −60° relative to the neutral axis.

5. The method according to claim 4, wherein the positive or negative sign of the second angle differs from the positive or negative sign of the first angle.

6. The method according to claim 1, wherein the step of evaluating the signal light comprises determination of a load on the rail, measurement of speed of passing trains, detection of direction of passing trains, wheel damages of trains on the rail and/or train classification of passing trains.

7. The method according to claim 1, wherein the at least one fiber-optic sensor unit has a converter structure which amplifies the shear deformation that acts on the at least one fiber-optic sensor unit.

8. A fiber optical sensor unit for detecting a mechanical force acting on a rail, comprising:
an optical fiber;
a fiber Bragg grating provided in the optical fiber which has a Bragg wavelength that depends on the mechanical force acting on the rail;
a converter structure comprising two spaced-apart rods connected by a bar, each of the two spaced-apart rods having a mounting point opposite a suspension point, wherein the bar is disposed between the mounting points and suspension points defining a pair of first lever arms extending between the bar and the suspensions points and a pair of second lever arms extending between the bar and the mounting points, wherein the converter structure is adapted to be mounted to the rail via the two mounting points, and wherein the optical fiber is clamped to the first lever arms at the suspension points; and
an edge filter for filtering a first part of a signal light generated by reflection or transmission of primary light irradiated on the fiber optical sensor unit, wherein the optical fiber connects the edge filter with the fiber Bragg grating.

9. The fiber-optic sensor unit according to claim 8, wherein the edge filter has a filter characteristic line with a nominal slope of between 2% and 7% per nm related to the transmitted intensity or less, wherein a measuring range of axle loads of 200 kg to 50,000 kg that act on the rail is provided.

10. The fiber-optic sensor unit according to claim 9, wherein the converter structure is designed to provide temperature compensation, wherein the thermal expansion coefficient of the converter structure of a converter structure with negative transmission ratio is smaller than the thermal expansion coefficient of the rail or wherein the thermal expansion coefficient of the converter structure of a converter structure with positive transmission ratio is larger than the thermal expansion coefficient of the rail.

11. The fiber-optic sensor unit according to claim 8, wherein the converter structure is designed to provide temperature compensation, wherein the thermal expansion coefficient of the converter structure of a converter structure with negative transmission ratio is smaller than the thermal expansion coefficient of the rail or wherein the thermal expansion coefficient of the converter structure of a converter structure with positive transmission ratio is larger than the thermal expansion coefficient of the rail.

12. A rail measuring system for measuring a shear deformation which acts on a rail, the rail measuring system comprising:
the rail with a longitudinal extension and a neutral axis which extends along the longitudinal extension on which rail a mechanical force acts which is generated by a train running thereon, wherein the areas above and below the neutral axis do experience the shear deformation, wherein the neutral axis does not experience the shear deformation; and
at least one fiber-optic sensor unit for detecting the mechanical force that acts on the rail, wherein the at least one fiber-optic sensor unit is mounted to the rail, wherein one mounting point of the at least one fiber-optic sensor unit is disposed on one side of the neutral axis and another mounting point is disposed on an opposite side of the neutral axis, wherein the at least one fiber-optic sensor unit comprises:
a fiber Bragg grating provided in an optical fiber which has a Bragg wavelength which depends on the mechanical force, wherein the at least one fiber-optic sensor unit is mounted to the rail across the neutral axis at a positive first angle of 30° to 60° relative to the neutral axis or at a negative second angle of −30° to −60° relative to the neutral axis of the rail.

13. The rail measuring system according to claim 12, wherein the at least one fiber-optic sensor unit is mounted to the rail at the positive angle of 45° relative to the neutral axis or at the negative angle of −45° relative to the neutral axis.

14. The rail measuring system according to claim 12, wherein the at least one fiber-optic sensor unit is mounted approximately at the neutral axis of the rail.

15. The rail measuring system according to claim 12, wherein the at least one fiber-optic sensor unit includes a converter structure, wherein the converter structure has a signal amplification lever and an edge filter for filtering a first part of a signal light, wherein the edge filter has a filter characteristic line with a nominal slope of 8% per nm related to the transmitted intensity or less, wherein a measuring range of axle loads of 200 kg to 50,000 kg that act on the rail is provided.

16. The rail measuring system according to claim 15, wherein the converter structure is designed to provide temperature compensation, wherein the thermal expansion coefficient of the converter structure of a converter structure with negative transmission ratio is smaller than the thermal expansion coefficient of the rail or wherein the thermal expansion coefficient of the converter structure of a converter structure with positive transmission ratio is larger than the thermal expansion coefficient of the rail.

17. The rail measuring system according to claim 12, further including an evaluation unit which is designed for a measuring frequency of 5 kHz, 8 kHz, 10 kHz or more.

18. The rail measuring system according to any claim 12, further comprising:
- a broad-band light source for irradiating the at least one fiber-optic sensor unit with a primary light for generating a signal light;
- a beam splitter for splitting the signal light into a first part of the signal light and into a second part of the signal light;
- a first detector for detecting the first part of the signal light and a second detector for detecting the second part of the signal light.

* * * * *